V. NIEWINSKI.
FLYCATCHER.
APPLICATION FILED APR. 9, 1920.

1,364,949.

Patented Jan. 11, 1921.

Inventor
V. Niewinski
By R. Morgan Elliott & Co.
Attorney

UNITED STATES PATENT OFFICE.

VICTOR NIEWINSKI, OF ST. PAUL, MINNESOTA.

FLYCATCHER.

1,364,949.

Specification of Letters Patent.   Patented Jan. 11, 1921.

Application filed April 9, 1920. Serial No. 372,605.

*To all whom it may concern:*

Be it known that I, VICTOR NIEWINSKI, a citizen of the United States of America, residing at St. Paul, in the county of Ramsey and State of Minnesota, have invented certain new and useful Improvements in Flycatchers, of which the following is a specification.

This invention relates to certain new and useful improvements in fly catchers and has for its primary object to provide a fly catcher of the bowl or bottle type that is formed of sections separable upon a horizontal line with resilient devices for maintaining the sections in assembled relation.

With the above general objects in view and others that will appear as the nature of the invention is better understood, the same consists in the novel form, combination and arrangement of parts hereinafter fully described, shown in the accompanying drawing and claimed.

Figure 1:
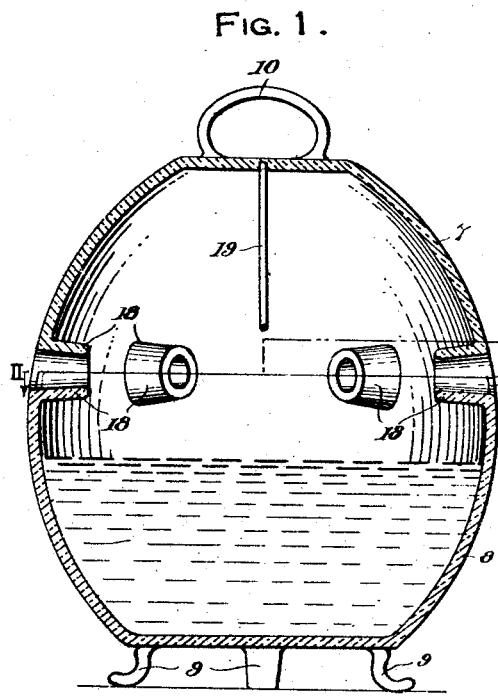
Figure 3:
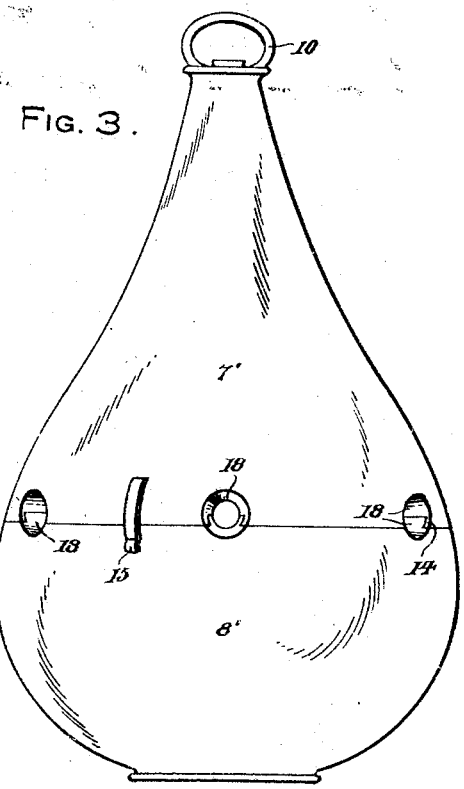
Figure 2:
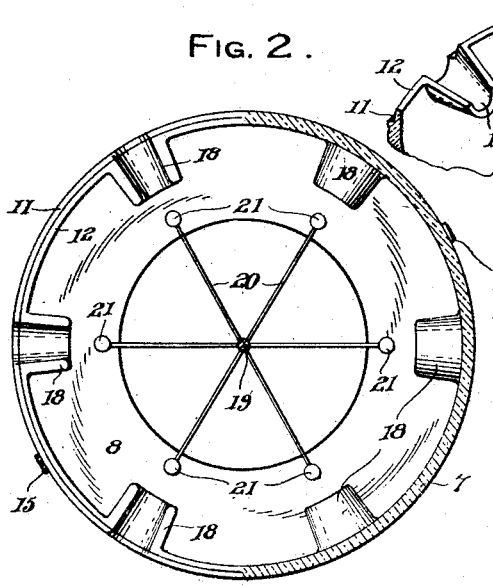
Figure 4:
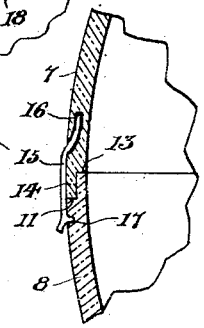
Figures 5, 6:
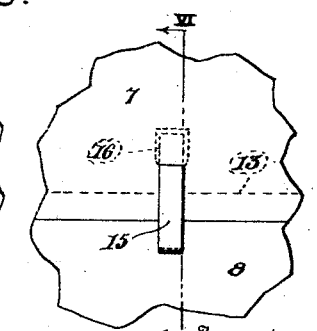

In the drawing wherein like reference characters designate corresponding parts throughout the several views, Figure 1 is a vertical sectional view of a fly catcher constructed in accordance with the present invention illustrating the side entrance openings to the receptacle, Fig. 2 is a horizontal sectional view taken on line II—II of Fig. 1 showing the side entrance openings and the star-shaped bait hook, Fig. 3 is a side elevational view of a modified form of the invention, showing the receptacle, of bottle like formation, Fig. 4 is a fragmentary detail view of a portion of the lower section of the receptacle showing one companion part of an entrance opening wall, Fig. 5 is a fragmentary elevational view of a portion of the receptacle showing the spring finger for maintaining the sections assembled, and Fig. 6 is a fragmentary sectional view of the construction shown in Fig. 5 and taken on line VI—VI of said figure.

Referring more in detail to the accompanying drawing and with particular reference to Figs. 1 and 3, there is illustrated a fly catcher embodying a receptacle formed of upper and lower sections 7 and 8 as shown in Fig. 1, the lower section carrying supporting feet 9 while the receptacle as shown in Fig. 1 is of bowl formation; the upper and lower sections 7' and 8' shown in Fig. 3 uniting to present a bottle like receptacle while the remaining elements of construction of the two forms shown by Figs. 1 and 3 are identical. The upper section of each form of receptacle is provided with a handle 10 at the upper end for purposes of transporting the same.

The upper edge of the lower section is provided with an exteriorly positioned annular recess 11 defining an upstanding rib 12 that is adapted to be received within the recess 13 formed upon the inner lower edge of the upper section, the recess 13 defining a depending shoulder 14 for reception in the recess 11 in the lower section. When the sections are united as shown in Figs. 1 and 6, the inner and outer surfaces thereof are continuous as illustrated. In order to maintain the sections in the assembled arrangement described, spring fingers 15 have their upper ends embedded as at 16 in the upper section of the receptacle as shown in Figs. 5 and 6 and projecting downwardly from the upper section to overlie the lower section with the lug 17 upon the lower end of the spring finger received in the companion socket of the lower receptacle section. Any number of these spring fingers may be employed and be suitably positioned to overlie the connection between the upper and lower sections for maintaining the sections in assembled formation.

The entrance openings to the receptacle are formed at the line of connection between the upper and lower sections, the entrance openings including corresponding inwardly directed semi-circular tapered flanges 18 that are adapted when the receptacle sections are united to form circular passageways.

A bait hook is arranged within the receptacle and embodies a rod 19 centrally depending from the upper section of the receptacle with radial arms 20 carried by the lower end thereof and provided upon their outer extremities with bait supports 21, a radiating arm 20 being directed toward each entrance opening as shown in Fig. 2 so that the bait upon the outer extremity of the arm will be freely accessible to a fly, and also being in a position to attract the flies into the receptacle.

While there are herein shown and described the preferred embodiments of the invention, it is nevertheless to be understood that minor changes may be made therein without departing from the spirit and scope of the invention as claimed.

What is claimed as new is:

1. A fly catcher of the type described comprising a two-part receptacle formed of upper and lower sections, companion curved flanges carried by each section constituting circular entrance passages to the receptacle, means for retaining the sections assembled, and bait suspending means within the receptacle.

2. A fly catcher of the type described formed of separable sections, said sections having inwardly directed curved flanges coöperating to provide entrance openings, a rod centrally depending from the upper section, and arms radiating from the lower end of said rod and each directed toward an adjacent entrance opening.

In testimony whereof I affix my signature.

VICTOR NIEWINSKI.